US012106950B2

(12) United States Patent
Thierley

(10) Patent No.: US 12,106,950 B2
(45) Date of Patent: Oct. 1, 2024

(54) VACUUM MODULE AND VACUUM APPARATUS AND METHOD FOR REGENERATION OF A VOLUME GETTER VACUUM PUMP

(71) Applicant: Edwards Vacuum LLC, Sanborn, NY (US)

(72) Inventor: Marcus Hans Robert Thierley, Shakopee, MN (US)

(73) Assignee: Edwards Vacuum LLC, Sanborn, NY (US)

( * ) Notice: Subject to any disclaimer, the term of this patent is extended or adjusted under 35 U.S.C. 154(b) by 142 days.

(21) Appl. No.: 17/905,441

(22) PCT Filed: Feb. 23, 2021

(86) PCT No.: PCT/IB2021/051502
§ 371 (c)(1),
(2) Date: Sep. 1, 2022

(87) PCT Pub. No.: WO2021/176300
PCT Pub. Date: Sep. 10, 2021

(65) Prior Publication Data

US 2023/0088465 A1 Mar. 23, 2023

(30) Foreign Application Priority Data

Mar. 5, 2020 (GB) ...................................... 2003215

(51) Int. Cl.
*H01J 41/20* (2006.01)
*H01J 41/06* (2006.01)

(52) U.S. Cl.
CPC .............. *H01J 41/20* (2013.01); *H01J 41/06* (2013.01)

(58) Field of Classification Search
CPC .......... F04B 37/02; F04B 23/04; F04B 41/06; H01J 41/06; H01J 41/12; H01J 41/20
(Continued)

(56) References Cited

U.S. PATENT DOCUMENTS 2,967,012 A * 1/1961 Connor .................. H01J 41/16 315/108
3,150,817 A * 9/1964 Jepsen .................... H01J 41/12 251/210
(Continued)

FOREIGN PATENT DOCUMENTS

CN 205858605 U 1/2017
CN 108757380 A 11/2018
(Continued)

OTHER PUBLICATIONS

Paolo Manini, Jun. 2017, Seminar on Getter pumps, CERN Accelerator School (Year: 2017).*
(Continued)

*Primary Examiner* — Charles G Freay
*Assistant Examiner* — Benjamin Doyle
(74) *Attorney, Agent, or Firm* — Theodore M. Magee; Westman, Champlin & Koehler, P.A.

(57) ABSTRACT

Method for the regeneration of a volume getter pump in a vacuum apparatus with a volume getter pump and an ion getter pump where the operating voltage of the ion getter pump is reduced, the current through the ion getter pump is recorded for determination of the pressure in the vacuum apparatus and then a heating element of the NEG is controlled as a function of the current of the ion getter pump for the purpose of heating the NEG material.

9 Claims, 3 Drawing Sheets

(58) Field of Classification Search
USPC ................................................ 417/49, 51, 50
See application file for complete search history.

(56) References Cited

U.S. PATENT DOCUMENTS

| | | | | | |
|---|---|---|---|---|---|
| 3,327,929 | A | | 6/1967 | Dillenbeck | |
| 3,796,917 | A | * | 3/1974 | Hiller | H01J 41/06 313/562 |
| 7,781,743 | B2 | * | 8/2010 | Katagiri | H01J 37/3056 315/108 |
| 8,342,813 | B2 | * | 1/2013 | Ferris | H01J 41/00 417/49 |
| 9,960,025 | B1 | * | 5/2018 | Hughes | F04B 37/14 |
| 10,629,417 | B1 | * | 4/2020 | Hughes | G05B 19/048 |
| 11,454,229 | B1 | * | 9/2022 | Corl | H01J 41/12 |
| 2004/0206239 | A1 | * | 10/2004 | Laubacher | F17C 1/00 96/108 |
| 2008/0284332 | A1 | * | 11/2008 | Adamec | H01J 37/073 313/558 |
| 2011/0089336 | A1 | * | 4/2011 | Kasuya | H01J 37/265 250/424 |
| 2012/0014814 | A1 | * | 1/2012 | Bonucci | F04B 37/14 417/49 |
| 2015/0028882 | A1 | * | 1/2015 | Brucker | F04B 35/04 324/469 |
| 2016/0025583 | A1 | | 1/2016 | Besling et al. | |
| 2016/0317971 | A1 | * | 11/2016 | McMurtry | G01N 33/0036 |
| 2017/0352517 | A1 | * | 12/2017 | Shichi | H01J 37/28 |
| 2019/0237289 | A1 | * | 8/2019 | Kasuya | H01J 9/025 |
| 2020/0343081 | A1 | * | 10/2020 | McBride | F04B 35/04 |
| 2022/0351934 | A1 | * | 11/2022 | Kawamoto | H01J 37/075 |
| 2023/0070087 | A1 | * | 3/2023 | Thierley | F04B 37/02 |

FOREIGN PATENT DOCUMENTS

| | | | |
|---|---|---|---|
| GB | 1127755 | | 9/1968 |
| JP | 2003343436 | A | 12/2003 |
| WO | 2010105944 | A1 | 9/2010 |
| WO | 2021176301 | A1 | 9/2021 |

OTHER PUBLICATIONS

PCT Notification of Transmittal of the International Search Report and the Written Opinion of the International Searching Authority, or the Declaration dated May 20, 2021 and International Search Report dated May 20, 2021 for corresponding PCT application Serial No. PCT/IB2021/051502, 6 pages.
British Examination Report dated Jul. 29, 2020 and Search Report dated Jul. 28, 2020 for corresponding British application Serial No. GB2003215.7, 5 pages.
PCT Written Opinion dated May 20, 2021 for corresponding PCT application Serial No. PCT/IB2021/051502, 7 pages.
British Examination Report dated May 31, 2022 for corresponding British application Serial No. GB2003215.7, 3 pages.
Agilent Technologies, Agilent 4UHV Ion Pump Controller Design to Optimize Pump Performance, Vacuum Solutions, Technical Overview, https://www.agilent.com/cs/library/technicaloverviews/public/5991-8141EN.pdf, 8 pages, May 24, 2017.
Saes Advanced Technologies, S.p.A., Operating Instructions, Nextorr D 100-5 Pump, https://mmrc.caltech.edu/Sample%20Suitcase/UHV%20suitcase/NexTorr%20100-5%20Manual.pdf, 18 pages, Jul. 29, 2013.
British Examination Report dated May 26, 2022 for corresponding British application Serial No. GB2003216.5, 5 pages.
British Examination Report dated Jul. 29, 2020 and Search Report dated Jul. 28, 2020 for corresponding British application Serial No. GB2003216.5, 5 pages.
PCT Notification of Transmittal of the International Preliminary Report on Patentability dated Apr. 22, 2022 and Response to Written Opinion dated Oct. 1, 2021 for corresponding PCT application Serial No. PCT/IB2021/051504, 21 pages.
PCT Notification of Transmittal of the International Search Report and the Written Opinion of the International Searching Authority, or the Declaration dated Apr. 23, 2021 for corresponding PCT application Serial No. PCT/IB2021/051504, 5 pages.
PCT Written Opinion of the International Searching Authority dated Apr. 23, 2021 for corresponding PCT application Serial No. PCT/IB2021/051504, 5 pages.
PCT Written Opinion of the International Preliminary Examining Authority dated Nov. 12, 2021 for corresponding PCT application Serial No. PCT/IB2021/051504, 6 pages.

* cited by examiner

VACUUM MODULE AND VACUUM APPARATUS AND METHOD FOR REGENERATION OF A VOLUME GETTER VACUUM PUMP

CROSS-REFERENCE TO RELATED APPLICATION

This application is a Section 371 National Stage Application of International Application No. PCT/IB2021/051502, filed Feb. 23, 2021, and published as WO 2021/176300 A1 on Sep. 10, 2021, the content of which is hereby incorporated by reference in its entirety and which claims priority of British Application No. 2003215.7, filed Mar. 5, 2020.

FIELD

The present invention relates to a vacuum module with a volume getter vacuum pump and an ion getter pump as well as to a vacuum apparatus with a volume getter vacuum pump and an ion getter pump as well as to a method for the regeneration of a volume getter vacuum pump.

BACKGROUND

A large number of industrial and scientific instruments and systems require an ultrahigh vacuum with pressures lower than $10^{-7}$ mbar. For the generation of such a vacuum in a vacuum apparatus combinations of various pump systems are normally employed. Thus, a main pump (roughing- or backing vacuum pump) is normally provided whereby a low vacuum with pressures of less than $10^{-1}$ mbar to $10^{-3}$ mbar is generated. The main vacuum pump is combined with a high vacuum pump for the generation of pressures of less than $10^{-3}$ mbar to $10^{-8}$ mbar, and possibly with an ultrahigh vacuum pump (UHV pump) for the generation of pressures lower than $10^{-7}$ mbar. UHV pumps include in such cases sorption pumps for the purpose of achieving the pressures necessary for the ultrahigh vacuum. Sorption pumps include, of course, ion getter pumps and volume getter vacuum pumps, volume getter vacuum pumps also being designated as getter pumps or volume getter pumps.

A large number of different gases may also be pumped by means of ion getter pumps. Ion getter pumps typically have two cathodes and one anode, between which a high voltage is applied. By means of the high voltage electrons are accelerated from the cathode to the anode and thereby ionise gas particles which are then accelerated towards the cathode and there sorbed or else reach the anode and are implanted there by virtue of their kinetic energy, so that in both cases they no longer contribute to the gas pressure. A magnetic field applied externally by a permanent magnet increases the potential for ionisation of the gas particles by the accelerated electrons. In that case the pump capacity of the ion getter pump is indicated by the size of the anode and cathode and is thus limited by the installation space available in a vacuum apparatus.

Known volume getter pumps work on the principle of the chemical sorption of reactive gaseous media in particular, such as oxygen, nitrogen, hydrogen and the like, although with hydrogen physisorption predominates. Known volume getter pumps also have a 'non-evaporable getter material' (NEG). These volume getter pumps are designated on the basis of their getter material as NEG. These pumps have a high sorption speed and thus also a high pumping speed, the pumping speed normally being higher than for ion getter pumps of the same size. A further advantage of volume getter pumps is that they allow hydrogen to be pumped more easily. However, the pumping effect of NEGs for hydrogen-carbon compounds is poor, and NEGs in particular are not capable of pumping noble gases.

During operation of the NEG, molecules and gas particles from the vacuum apparatus are bonded to its surfaces and thus no longer contribute to the pressure within the vacuum apparatus. As a result of these deposits, the active surface of the NEG material which contributes to the pump capacity of the NEG decreases. When no active surface of the NEG remains available, then the pump capacity of the NEG falls towards zero. The NEG must then be regenerated. This normally occurs by heating of the NEG material, which is referred to as 'bakeout'. In this process the molecules and gas particles bonded to the surface of the NEG material are buried within the NEG material by diffusion, so that active surface of the NEG material is once more available. Hydrogen is not bonded to the surface but is bonded within the solid body by means of diffusion. On regeneration, this is again released and must be removed by other vacuum pumps from the vacuum chamber. The regeneration process must only occur at pressures normally less than $10^{-5}$ mbar or $10^{-6}$ mbar. Failing this, destruction of the NEG material would ensue. Until now it has been the responsibility of the user of a vacuum apparatus to ensure that these required pressures are adhered to.

Combined pumps comprising a NEG pump and an ion getter pump are known, where the ion getter pump is normally switched off during the regeneration process of the NEG, that is to say the supply voltage to the ion getter pump is reduced to 0, so that the ion getter pump no longer results in any pump output. This means that filling of the ion getter pump by gas particles which escape from the NEG during bakeout/regeneration of the NEG material is prevented. Maintenance of the vacuum has to be ensured by other pump systems, for example external turbopump systems.

Thus, with existing systems additional monitoring of the vacuum during the NEG regeneration process is necessary. This requires additional technical steps for measurement of the pressure within the vacuum apparatus, as well as permanent monitoring to prevent destruction of the NEG material.

The discussion above is merely provided for general background information and is not intended to be used as an aid in determining the scope of the claimed subject matter. The claimed subject matter is not limited to implementations that solve any or all disadvantages noted in the background.

SUMMARY

The technical problem of the present invention is to devise a method whereby an NEG material of an NEG may be securely and reliably regenerated.

This problem is solved by means of a method according claim 1 as well as a vacuum module according to claim 7 or a vacuum apparatus according to claim 8.

The method according to the invention for regeneration of a volume getter pump ('non-evaporable getter pump'—NEG) is applied to a vacuum module with an NEG and an ion getter pump, or is applied to a vacuum apparatus with an NEG and an ion getter pump. In this case NEG and ion getter pump are always connected to the vacuum apparatus.

In the method according to the invention, the operating voltage of the ion getter pump is reduced. However, there is only a reduction in the operating voltage of the ion getter pump. The operating voltage is not reduced to 0, nor is the operating voltage of the ion getter pump turned off. The current through the ion getter pump is then recorded for determination of the pressure within the vacuum apparatus. The current through the ion getter pump is here proportional to the pressure inside the vacuum apparatus. Then a heating element of the NEG is controlled as a function of the current of the ion getter pump for the purpose of bakeout of the NEG material and regeneration of the same. Thus, the ion getter pump is used for determination of the pressure inside the vacuum apparatus, so that no further technical means are required to determine the pressure within the vacuum apparatus. Instead, the existing ion getter pump is used for determination of the pressure in the vacuum apparatus, by measurement of the current through the ion getter pump. The ion getter pump is in that case used as a cold cathode gauge. Since the heating element of the NEG is controlled as a function of the current of the ion getter pump, control of the heating element of the NEG occurs in direct dependence on the pressure of the vacuum apparatus.

Preferably, the operating voltage of the ion getter pump is at least reduced to a point at which there is essentially no longer any pumping action. This prevents material which escapes from the NEG material on regeneration from being deposited in/bonded to the ion getter pump. For this, it is preferred that the operating voltage of the ion getter pump is reduced to less than 5 kV, in particular to less than 3 kV, and most preferably to less than 1 kV. At such an operating voltage, no appreciable pumping action of the ion getter pump remains. At the same time, however, the current through the ion getter pump remains proportional to the pressure within the vacuum apparatus, so that the ion getter pump can be used to determine the pressure within the vacuum apparatus.

It is preferred that the heating element is switched off, if the current recorded by the ion getter pump corresponds to a pressure which exceeds a first pre-set pressure. If the pressure within the vacuum apparatus rises above the first pre-set pressure, the heating element of the NEG is thus switched off, in order to prevent destruction of the NEG material. Thus, it is at all times ensured that regeneration of the NEG material is only performed at pressures where there is no risk of destruction of the NEG material.

Preferably, the heat output is increased if the current recorded by the ion getter pump corresponds to a pressure which lies below a second pre-set pressure. If thus a better vacuum exists in the vacuum apparatus than is required for regeneration of the NEG, the regeneration temperature can be increased and as a result of the increased heat output of the heating element regeneration can be accelerated, so that the regeneration time necessary for achieving complete regeneration of the NEG material is reduced. Normally, at a pressure of around $10^{-6}$ mbar, regeneration of a typical NEG material occurs at 300° C. to 400° C. If the pressure in the vacuum apparatus now falls to $10^{-7}$ mbar for example, regeneration of the NEG material at higher temperatures can occur, for example up to 700° C., in which case the required regeneration time can be significantly reduced. Consequently, rapid regeneration is possible where it is ensured that only those temperatures are generated by the heating element of the NEG for which the required pressure exists and damage to or destruction of the NEG material can be avoided.

Preferably, the first pre-set pressure and/or the second pre-set pressure amounts to $10^{-5}$ mbar, and preferably $10^{-6}$ mbar. In particular, the first pre-set pressure and the second pre-set pressure may be identical.

It is preferred that continuous adjustment of the heat output of the heating element of the NEG to the pressure in the vacuum apparatus is able to occur. For example, at a first pre-set pressure of $10^{-5}$ mbar within the vacuum apparatus the heating element of the NEG could be switched off. At lower pressures below the second pre-set pressure, the heat output of the heating element is increased continuously in dependence on the vacuum within the vacuum apparatus.

The present invention further relates to a vacuum module with a volume getter pump (NEG) and an ion getter pump, where the NEG and ion getter pump are directly connected to each other, so that there is a combination of an NEG and an ion getter pump. In this case NEG and ion getter pump are connected to a control unit, the control unit being designed to carry out the method described above.

The present invention further relates to a vacuum apparatus with a volume getter pump (NEG) and an ion getter pump, where NEG and ion getter pump are arranged separately from each other in the vacuum apparatus. NEG and ion getter pump are further connected to a control unit, where the control unit is designed to carry out the method described above.

Preferably, the control unit comprises a common control unit for NEG and ion getter pump, thus ensuring a compact design.

The summary is provided to introduce a selection of concepts in a simplified form that are further described in the detailed description. This summary is not intended to identify key features or essential features of the claimed subject matter, nor is it intended to be used as an aid in determining the scope of the claimed subject matter.

BRIEF DESCRIPTION OF THE DRAWINGS

The invention will now be explained below in greater detail on the basis of a preferred embodiment with reference to the attached Drawings.

The Drawings show as follows.

DETAILED DESCRIPTION

Figure 1:
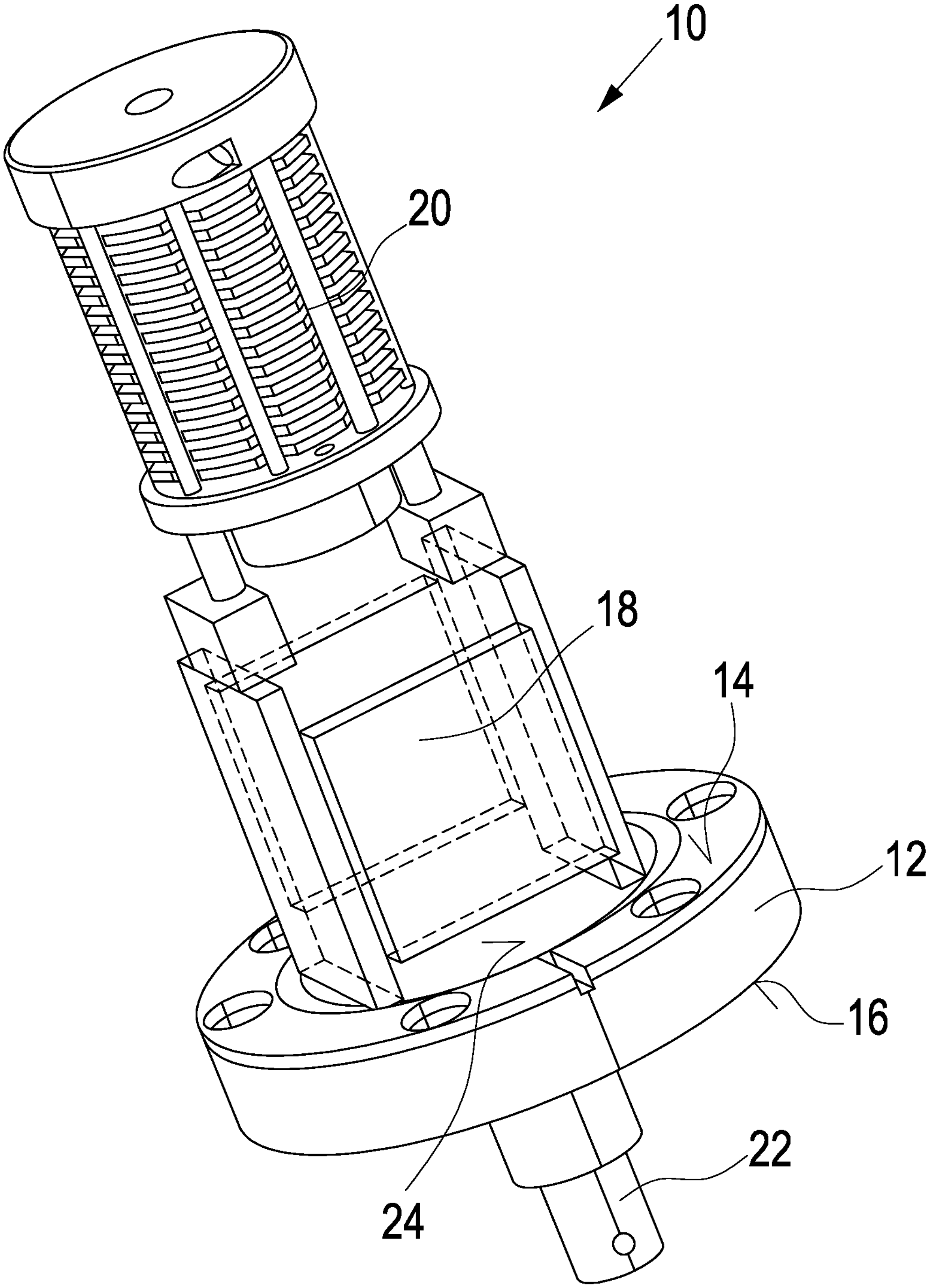
FIG. 1: a first embodiment of the pump module according to the invention.

The pump module 10 according to the invention has a flange 12 with a first side 14 and a second side 16, which lies opposite the first side. If the flange 12 is connected to a vacuum apparatus (not shown), the first side 14 faces the vacuum apparatus and is in particular exposed to the vacuum created inside the vacuum apparatus. The second side 16 is exposed to an atmospheric pressure and is arranged outside the vacuum apparatus. With the aid of known means such as screws and seals, the flange 12 can be connected to the vacuum apparatus in a vacuum-tight manner.

An ion getter pump 18 is connected to the first side 14 of the flange 12. A volume getter pump (NEG) 20 is arranged on that side of the ion getter pump 18 opposite to the flange 12 side. Flange 12 and NEG 20 are thus arranged at opposite ends of the ion getter pump. This means that NEG 20 is not directly connected to the flange 12, but rather indirectly by means of the ion getter pump 18. Thus, in installed state, ion getter pump 18 and NEG 20 protrude into the vacuum apparatus and are so arranged therein to pump gases.

The flange 12 further possesses a common lead-through 22, by means of which the high voltage for operation of the ion getter pump 18 as well as the low voltage for the heating element for regeneration of the NEG are led through. This means that only one lead-through is necessary, so that the number of potential leaks of the ultrahigh vacuum apparatus can be reduced.

The diameter of the flange 12 can be kept small by virtue of the stacked or serial structure of the NEG 20, ion getter pump 18 and flange 12, since the diameter of the flange or the diameter of the flange face 24, which is situated directly within the vacuum, corresponds exactly to, or is slightly greater than, the base area of the ion getter pump 18 or NEG 20. Thus, on installation, NEG 20 and ion getter pump 18 are introduced via the flange opening and are attached securely to the vacuum apparatus by attachment of the flange 12 to the vacuum apparatus.

Figure 2:
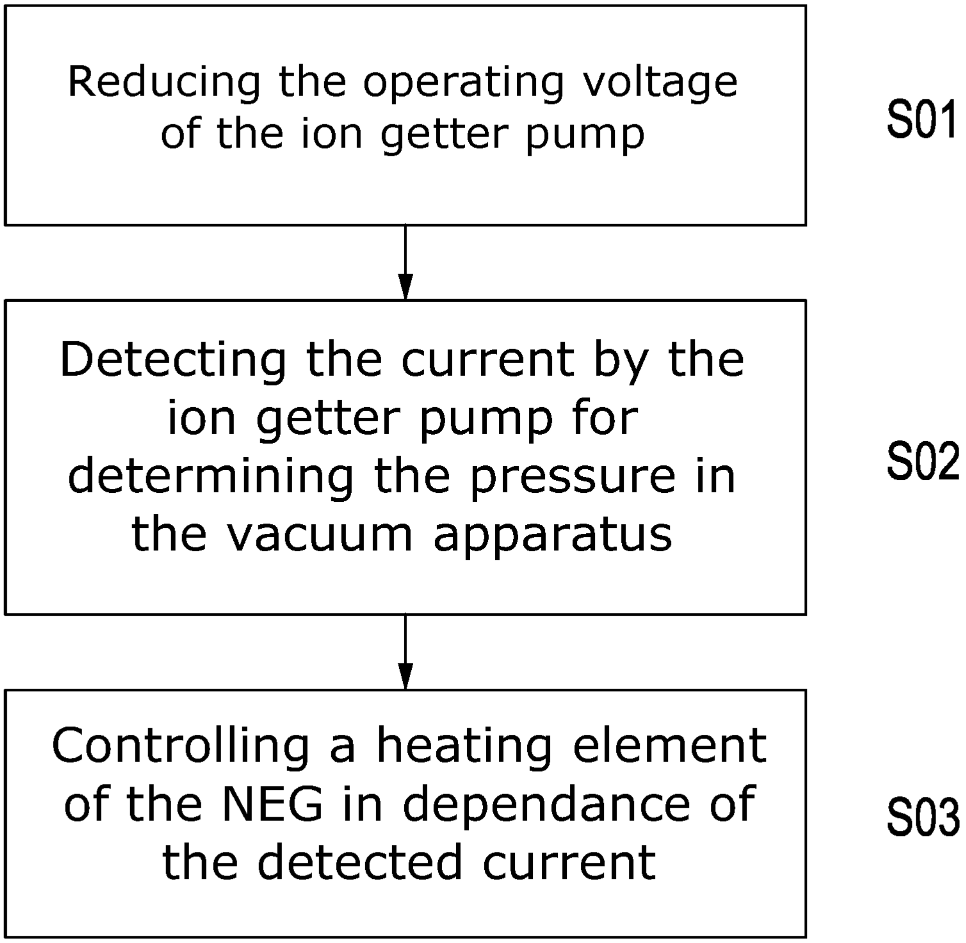
FIG. 2: a flow chart of the method according to the invention.

With the method according to the invention as represented in FIG. 2, in a first Step S01 the operating voltage of the ion getter pump is reduced. In this case there is no reduction to 0, nor is the supply voltage to the ion getter pump switched off. Rather, there is simply a reduction in the operating voltage of the ion getter pump, so that effectively there is no longer any pumping action of the ion getter pump. The operating voltage or voltage between the cathode and anode of the ion getter pump may in that case amount to 1 kV for example. At such an operating voltage the current through the ion getter pump is proportional to the pressure inside the vacuum apparatus to which the ion getter pump and also the NEG are connected. In a second Step S02 the current through the ion getter pump is recorded and owing to the proportionality which exists is used for determination of the pressure within the vacuum apparatus. In a third Step S03 of the method according to the invention, a heating element of the NEG 20 is controlled in dependence on the current of the ion getter pump, which corresponds to the pressure inside the vacuum apparatus, for the purpose of bakeout and regeneration of the NEG material.

Figure 3:
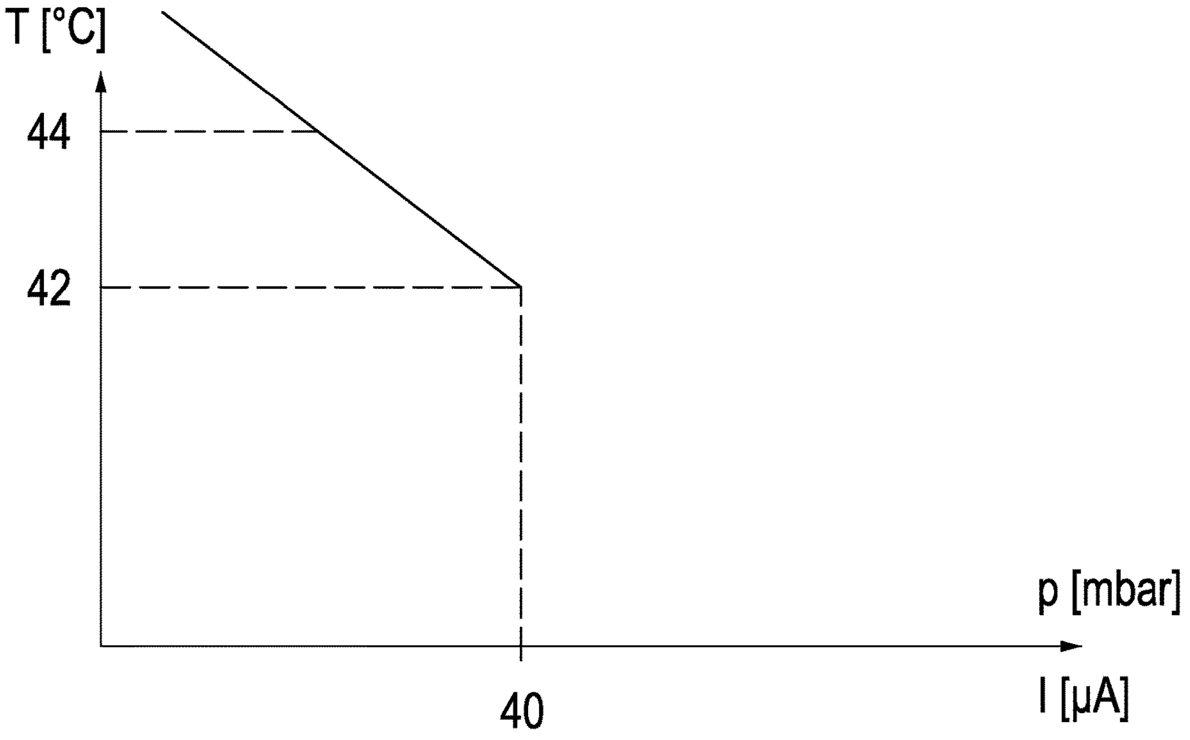
FIG. 3: a diagrammatic representation of the correlation between the current determined by the ion getter pump and the regeneration temperature of the NEG according to the present method.

FIG. 3 is a diagrammatic representation of the correlation between the current, which is determined by the ion getter pump and which corresponds to the pressure inside the vacuum apparatus, and the bakeout temperature of the NEG material for regeneration of the NEG material.

In FIG. 3, the pressure or the current of the ion getter pump is plotted on the x-axis against the y-axis, which corresponds to the temperature of the heating element. Up to a first pressure 40, which lies for example at $10^{-5}$ mbar or $10^{-6}$ mbar, no heating of the NEG material occurs, as this could result in destruction of the NEG material. If however a pressure is present which is lower than the threshold value, bakeout and thus regeneration of the NEG material occurs, in which case as the pressure falls there is a higher temperature of the heating element of the NEG, so that faster regeneration of the NEG material can be achieved. If for example at a first pressure 40 there is a first bakeout temperature of 42, then at a pressure lower than the first pressure there is a second bakeout temperature 44, which is higher than the first bakeout temperature 42 of the heating element of the NEG 20. In that case the correlation between pressure and bakeout temperature must be non-linear, as diagrammatically illustrated in FIG. 3, but may follow any functional correlation and is adjusted to the application in question.

Consequently, a method is proposed whereby regeneration of an NEG material in an NEG is reliably, securely and efficiently brought about by utilisation of an existing ion getter pump.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A method for the regeneration of a volume getter pump (NEG) in a vacuum apparatus with the NEG and an ion getter pump, where an operating voltage of the ion getter pump is reduced to a voltage at which no effective pumping is performed by the ion getter pump but the ion getter pump continues to generate a pressure-dependent current, the pressure-dependent current through the ion getter pump is recorded for determination of a pressure in the vacuum apparatus, and a heating element of the NEG is controlled as a function of the pressure-dependent current through the ion getter pump for the purpose of heating an NEG material of the NEG while maintaining the operating voltage of the ion getter pump at the voltage at which no effective pumping is performed by the ion getter pump but the ion getter pump continues to generate the pressure-dependent current.

2. The method in accordance with claim 1, where the operating voltage is reduced to less than 5 kV.

3. The method in accordance with claim 1, where the heating element is switched off if the pressure-dependent current recorded through the ion getter pump corresponds to a pressure which lies above a first pre-set pressure.

4. The method in accordance with claim 3, where the heat output of the heating element is increased if the pressure-dependent current recorded through the ion getter pump corresponds to a pressure which lies below a second pre-set pressure.

5. The method in accordance with claim 4, where the first pre-set pressure and the second pre-set pressure corresponds to $10^{-5}$ mbar.

6. A vacuum apparatus with a volume getter pump (NEG) and an ion getter pump, where the NEG and the ion getter pump are directly connected, where the NEG and the ion getter pump are connected to a control unit, and where the control unit is configured to:

reduce an operating voltage of the ion getter pump to a voltage at which no effective pumping is performed by the ion getter pump but the ion getter pump continues to generate a pressure-dependent current, record the pressure-dependent current through the ion getter pump to determine a pressure in the vacuum apparatus; and control a heating element of the NEG as a function of the pressure-dependent current of the ion getter pump for the purpose of heating an NEG material of the NEG while maintaining the operating voltage of the ion getter pump at the voltage at which no effective pumping is performed by the ion getter pump but the ion getter pump continues to generate the pressure-dependent current.

7. A vacuum apparatus with a volume getter pump (NEG) and an ion getter pump, where the NEG and the ion getter pump are arranged separately from each other in the vacuum apparatus, where the NEG and the ion getter pump are connected to a control unit, and where the control unit is configured to:

reduce an operating voltage of the ion getter pump to a voltage at which no effective pumping is performed by the ion getter pump but the ion getter pump continues to generate a pressure-dependent current, record the pressure-dependent current through the ion getter pump to determine a pressure in the vacuum apparatus; and control a heating element of the NEG as a function of the pressure-dependent current of the ion getter pump for the purpose of heating an NEG material of the NEG while maintaining the operating voltage of the ion getter pump at the voltage at which no effective pumping is performed by the ion getter pump but the ion getter pump continues to generate the pressure-dependent current.

8. The method in accordance with claim 1, where the operating voltage is reduced to less than 3 kV.

9. The method in accordance with claim 1, where the operating voltage is reduced to less than 1 kV.

* * * * *